No. 813,794. PATENTED FEB. 27, 1906.
H. J. HAYS.
APPARATUS FOR FORMING SHEET AND PLATE GLASS.
APPLICATION FILED AUG. 9, 1904.
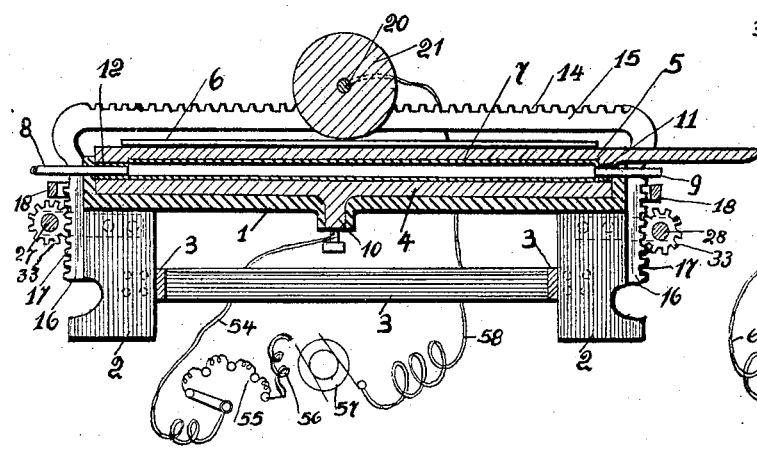
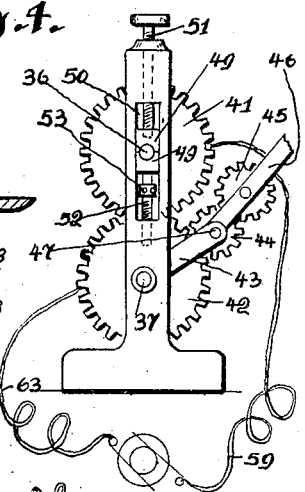
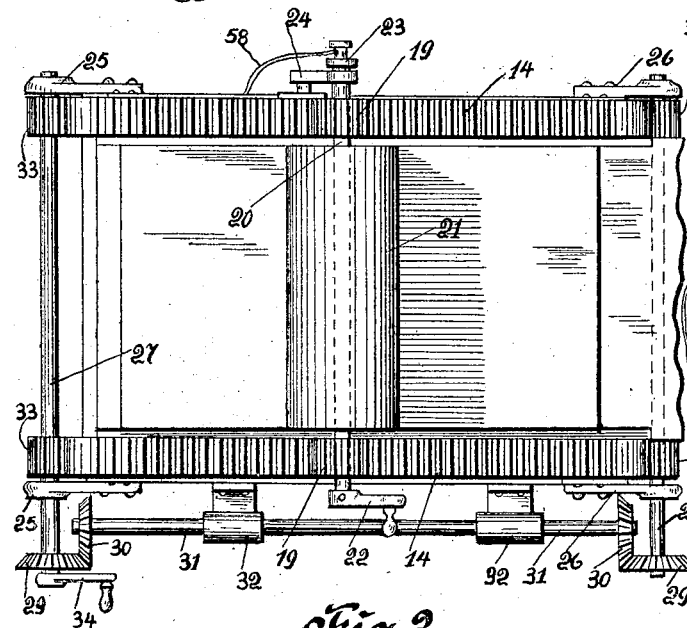
Witnesses
C. Klostermann
K. H. Butler
Inventor
Harry Jacob Hays
by N. C. Evert & Co.
Attorneys

UNITED STATES PATENT OFFICE.

HARRY JACOB HAYS, OF PITTSBURG, PENNSYLVANIA, ASSIGNOR TO EDWARD F. HAYS, TRUSTEE, OF PITTSBURG, PENNSYLVANIA.

APPARATUS FOR FORMING SHEET AND PLATE GLASS.

No. 813,794.     Specification of Letters Patent.     Patented Feb. 27, 1906.

Application filed August 9, 1904. Serial No. 220,099.

*To all whom it may concern:*

Be it known that I, HARRY JACOB HAYS, a citizen of the United States of America, residing at Pittsburg, in the county of Allegheny and State of Pennsylvania, have invented certain new and useful Improvements in Apparatus for Forming Sheet and Plate Glass, of which the following is a specification, reference being had therein to the accompanying drawings.

This invention has relation to certain new and useful improvements in an apparatus for forming sheet or plate glass; and the object of this invention is to so form the glass that the same is of an even thickness and is of a uniform and equal quality, with polished surfaces.

Another object of this invention is to provide a novel form of apparatus for heating the glass during the process of forming the sheet or plate, and novel means is provided for maintaining heat in portions of the glass that is being manipulated.

A further object of this invention is to provide novel means in connection with the apparatus whereby an electric current is passed through the piece of glass to heat the same during the process of rolling the piece of glass, and I employ means for controlling the strength of the current to be passed through the glass.

The invention finally resides in the novel construction, combination, and arrangement of parts to be hereinafter more fully described and then specifically pointed out in the claims, and referring to the drawings forming a part of this application like numerals of reference designate corresponding parts throughout the several views, in which—

Figure 1 is a longitudinal sectional view, partly in elevation, of my improved apparatus. Fig. 2 is a top plan view of a portion of the apparatus. Fig. 3 is a front elevation of a portion of the apparatus, a part of the same being broken away. Fig. 4 is a side elevation of the same.

To put my invention into practice, I employ a table 1, the bed portion of which is formed of an insulating material, and this bed portion is supported by suitable legs 2 2, which are braced by the longitudinal and transverse beams 3 3. In the insulated bed of the table I provide a receptacle 4 of conducting material, the top 5 of which forms a surface upon which a sheet of glass 6 is to be treated. The receptacle 4 is provided with an insulated lining 7 and an inlet-pipe 8 and an outlet-pipe 9. The receptacle is also provided with a depending binding-post 10, and the pipes 8 and 9 are insulated by the collars 11 and 12 from the receptacle.

Each side of the table is provided with a rack 14, which is carried by a bracket 15, that is supported from the ends of the table, and the supporting-arms 16 16 of these brackets are provided with racks 17 17 and are slidably mounted in the guides 18 18. The brackets are so formed that they will extend a slight distance above the top of the receptacle, and upon the racks 14 of each bracket rest pinions 19 19, in which is mounted a shaft 20, and upon this shaft is journaled a roller 21, said roller being journaled by the pinions, whereby as the pinions travel upon the rack the roller will revolve upon the shaft and engage the sheet of glass 6, which lies upon the top of the receptacle 4. To propel the roller 21 along the table, I employ the crank-handle 22, and upon the one end of the shaft 20 I provide a binding-post 23, this same end being provided with a depending guide-arm 24, which is adapted to engage the side of the table and steady the movement of the roller when the same is being operated. Upon each end of the table I provide bearings 25 25 and 26 26. In the bearings 25 is mounted a shaft 27, and in the bearings 26 is mounted a shaft 28. Upon the one end of each shaft I mount a beveled gear 29 29, these beveled gears being adapted to mesh with similar gears 30 30, carried upon the ends of a shaft 31, which is mounted in brackets 32 32, carried by the one side of the table. The shafts 27 and 28 are provided with pinions 33 33, which are adapted to mesh with the racks 17 of the supporting-arms 16. Upon one end of the shaft 27 is mounted a crank-handle 34.

In conjunction with the apparatus just described I employ two rollers 35 35, which are mounted upon shafts 36 and 37, that are journaled in suitable housings 38 38. The rollers are adapted to be mounted at one end of the table 1, and the one end of the shafts 36 and 37 are provided with binding-posts 39 and 40, respectively, while upon the opposite ends of the shafts 36 and 37 are mounted gear-wheels 41 and 42, which are adapted to mesh with each other, whereby as one roller revolves a similar movement will be imparted to the other roller. Mounted upon the shaft 37 are the arms 43, and between these arms is mounted a pinion 44, which is adapted to mesh with the gear-wheel 42, also with a pinion 45, mounted between a yoke 46, which is pivotally mounted upon a shaft 47, that supports the pinion 44 between the arms 43 43. The shaft 36 is provided with a crank-handle 48 upon its one end, whereby a revoluble motion may be transmitted to the roller 35 and then through the medium of the gears 41 and 42 to the roller 35.

To provide means whereby the upper roller may be adjusted, I have journaled the upper shaft 36 of said roller in bearing-blocks 49 49, which are mounted in guideways 50, formed in each side of the housings. The blocks 49 49 are adjusted within the guideways by screws 51 51, which pass down through said housings and engage said bearing-blocks, and also by screws 52 52, which are mounted in the said guideways and are operated by inserting an instrument into the recessed collar 53 of each screw.

The electrical connections of my apparatus and the manner of operating the same are as follows: To the binding-post 10 of the receptacle 4 is connected a wire 54, which leads to a suitable rheostat 55, and from this rheostat a wire 56 leads to a suitable generator 57, the opposite pole of this generator being connected by a wire 58 to the binding-post 23 of the shaft 20. When the sheet of glass is placed upon the top of the receptacle and the roller 21 is in engagement with the same, the circuit is as follows: From the generator 57 the current passes through the wire 58 to binding-post 23, through the roller 21, through the sheet of glass 6 to the receptacle 4, from the binding-post 10 of said receptacle, through the wire 54 to the rheostat 55, where the resistance of the current may be governed, and then through a wire 56 to the generator. It will thus be seen that the current passes through the receptacle 4, and in order to insulate the same from the table I have provided the insulating-bed in which the receptacle rests and is supported, and to prevent the current from causing the receptacle to become heated to such an extent as to render the apparatus impractical I have provided the inlet-pipe 8 and the outlet-pipe 9, whereby a continuous flow of water may be admitted to the receptacle and emitted through the pipe 9, and to prevent the water of said receptacle from interfering with the current of electricity I have provided the insulated lining 7 for this purpose. When the glass is placed upon the table, the roller 21 is adjusted to engage the glass by the crank-handle 34, which, through the medium of the shaft 31 and shafts 27 and 28 and their respective gears, the brackets 15, 15, may be raised or lowered, as desired, and upon the roller 21 being brought into engagement with the piece of glass the crank-handle 22 is turned to rotate the pinions 19 19, which will travel upon the racks 14 14 of their respective brackets, and the rotation of said pinions will cause the roller 21 to revolve and travel upon the sheet of glass. As the circuit of the electric current is through the roller, the piece of glass, and the receptacle, the piece of glass will only be heated at such points as the roller contacts with the same, and by the receptacle being charged a circuit is established at any point upon the sheet of glass where said roller should engage. By employing the adjusting means of the brackets 15 15 it will be seen that the roller may be raised or lowered to govern the thickness of the piece of glass to be rolled and that all flaws in the glass— such as air-bubbles, irregularities, and unsmooth and unclear surfaces—will be rolled out of the glass and a piece of glass of a uniformly smooth, clear, and transparent character effected. Should the piece of glass which has been treated as above described have to be reduced in thickness or have any flaws therein that have not been overcome by the operation just described, the piece of glass is carried by any suitable means from the table to the rollers 35 35 and is fed therethrough, tongs or any suitable instrument being employed for pulling or manipulating the glass during its passage therethrough. As the glass passes through the rollers 35 35 the same will be heated by a current which passes through said glass. The binding-post 39 carried by the shaft 36 is connected by a wire 59 to a suitable generator 60, and from this generator a wire 61 passes to a rheostat 62, from where a wire 63 passes to the binding-post 40 of the shaft 37. When a piece of glass is being passed through the rolls, the circuit is as follows: The current from the generator passes through the wire 61 to the rheostat, from said rheostat to binding-post 40, through shaft 37 to roll 35, through said glass to the upper roll, and from said roll through shaft 36, binding-post 39 to wire 59, and thence to the generator 60. To regulate the thickness of the glass passing through said rolls, the upper roll 35 may be adjusted by the screws 51 and 52, and should the thickness of the glass be of such a dimension as to cause the upper roller carrying the gear-wheel 41 to become disengaged from the gear-wheel 42 the yoke 46 is raised to place a pinion 45 in engagement with the gear-wheel 41, whereby a rotary motion will be imparted from the gear-wheel 41 through the medium of the pinions 45 and 44 to the gear-wheel 42, which will revolve the lower roll 35, these rolls being manipulated by the crank-handle 48.

The housing and the rolls just described are only employed where it is found that the piece of glass after being treated upon the table is defective, and while I have herein shown and described the set of rolls as being a particular adjunct to the apparatus I wish it to be understood that these rolls may be dispensed with where the piece of glass which has been treated upon the table is of a uniform and equal quality and of an even thickness and of a smooth and flawless character. It will also be noted that other means than those shown and described for raising and lowering the roller 21 of the apparatus may be employed, and I do not care to limit myself to the specific construction and arrangement of the different parts, but may vary the same as will be permitted by the appended claims.

Having fully described my invention, what I claim, and desire to secure by Letters Patent, is—

1. An apparatus of the type set forth, comprising a body of insulating material mounted upon legs, a receptacle seated in said insulating material and having a hollow interior and adapted to receive a cooling liquid and having an inlet-pipe and an outlet-pipe, the upper side of said receptacle constituting a rolling-surface, a roller mounted above said receptacle and out of contact therewith, means for transmitting a current of electricity through said receptacle and through said roller and means for moving said roller in a horizontal direction above said rolling-surface.

2. An apparatus of the character described, comprising legs, a receptacle mounted on said legs and insulated therefrom, a roller mounted above said receptacle and out of contact therewith, means for propelling said roller along said receptacle, means for passing an electric current through said receptacle and through said roller and means for varying the resistance of an electric circuit including said roller and said receptacle.

3. An apparatus of the type set forth, comprising a table having a rolling-surface, a roller adjustably mounted above and out of contact with said rolling-surface, means for propelling said roller along the table and for positively revolving the roller as it is propelled along the table, means for passing an electric current through said table and said roller and means for cooling said table.

4. An apparatus of the type set forth comprising a hollow table, having inlet and outlet ports, and an insulating-lining, means for supplying water and causing it to pass through said table, a roll adjustably mounted above said table, means for passing an electric current through said table, and said roll, and means for propelling said roll along said table.

5. In an apparatus of the character described, the combination of a table, racks carried by brackets mounted on the table, a roll, pinions carried by said roll and meshing with said racks, and means carried by the said brackets and coengaging means mounted on the table for adjusting said brackets vertically.

6. In an apparatus of the character described, the combination of a table, vertical supporting-arms mounted at each end of the table and having racks formed on their edges, pinions engaging said racks, shafts on which said pinions are mounted, connections between said shafts, means for turning the shafts, and a roll supported by said brackets.

7. In an apparatus of the character described, the combination of a table, a roll mounted above the table, an insulated rolling-surface mounted on said table, an electric circuit including a source of electric energy and including the said roll and said insulated rolling-surface, a pair of rolls arranged in proximity to said table said rolls being insulated from one another and an electric circuit including said pair of rolls, and a source of electric energy.

8. In an apparatus of the character described, the combination of a table, brackets mounted at each edge of the table, a roll having a shaft, supported by said brackets and adapted to roll on the same, and a depending arm carried by said shaft and engaging the table to steady the roll in its movement over the table.

In testimony whereof I affix my signature in the presence of two witnesses.

HARRY JACOB HAYS.

Witnesses:
 H. C. EVERT,
 K. H. BUTLER.